US012565738B2

(12) United States Patent
Berglund et al.

(10) Patent No.: US 12,565,738 B2
(45) Date of Patent: Mar. 3, 2026

(54) PALLET OUTER PACKAGING PAPER

(71) Applicant: Mondi AG, Vienna (AT)

(72) Inventors: Lars Göran Berglund, Sundsvall (SE); Elisabeth Schwaiger, St. Stefan (AT)

(73) Assignee: Mondi AG, Vienna (AT)

( * ) Notice: Subject to any disclaimer, the term of this patent is extended or adjusted under 35 U.S.C. 154(b) by 404 days.

(21) Appl. No.: 18/245,549

(22) PCT Filed: Sep. 15, 2021

(86) PCT No.: PCT/AT2021/060327

§ 371 (c)(1),
(2) Date: Dec. 7, 2023

(87) PCT Pub. No.: WO2022/056567

PCT Pub. Date: Mar. 24, 2022

(65) Prior Publication Data

US 2025/0012015 A1 Jan. 9, 2025

(30) Foreign Application Priority Data

Sep. 16, 2020 (AT) .............................. A 50785/2020

(51) Int. Cl.
*D21H 27/10* (2006.01)
*B31F 1/12* (2006.01)
(Continued)

(52) U.S. Cl.
CPC ............... *D21H 27/10* (2013.01); *B31F 1/12* (2013.01); *B65B 11/045* (2013.01); *D21H 15/04* (2013.01); *D21H 17/23* (2013.01); *D21H 21/18* (2013.01)

(58) Field of Classification Search
CPC ........ D21H 27/10; D21H 15/04; D21H 17/23; D21H 21/18; D21H 15/02; D21H 17/28;
(Continued)

(56) References Cited

U.S. PATENT DOCUMENTS

| | | | | |
|---|---|---|---|---|
| 5,351,461 | A | 10/1994 | Fandard et al. | |
| 11,339,537 | B2 * | 5/2022 | Everett | D21H 13/06 |

(Continued)

FOREIGN PATENT DOCUMENTS

| | | | | |
|---|---|---|---|---|
| DE | 4018111 | | 12/1991 | |
| DE | 102023119650 | A1 * | 1/2025 | D21H 19/74 |

(Continued)

*Primary Examiner* — Jose A Fortuna

(74) *Attorney, Agent, or Firm* — Dunlap Bennett & Ludwig PLLC

(57) ABSTRACT

A pallet outer packaging paper, to an outer packaging method using this pallet outer packaging paper as an outer packaging material, and to a method for producing such a pallet outer packaging paper. The pallet outer packaging paper comprises at least 70 wt. % cellulose fibres having a length-weighted average fibre length in accordance with ISO 16065-2:2014 of 1.8 mm to 2.8 mm, and has a bending stiffness in accordance with ISO 2493-1:2010, using a bend angle of 15° and a test bend length of 10 mm, of at most 35 mN in the machine direction and at most 30 mN in the transverse direction, and a bending stiffness index of at most 100 $Nm^6/kg^3$ in the machine direction and at most 80 $Nm^6/kg^3$ in the transverse direction, and a grammage of 50 $g/m^2$.

19 Claims, 3 Drawing Sheets

(51) Int. Cl.
*B65B 11/04* (2006.01)
*D21H 15/04* (2006.01)
*D21H 17/23* (2006.01)
*D21H 21/18* (2006.01)

(58) Field of Classification Search
CPC ........ D21H 27/02; D21H 11/04; D21H 17/29; D21H 21/16; D21H 27/40; D21F 11/02; B65D 71/0085; B65D 19/0004; B65D 19/00; B65D 19/02; B65D 71/06; B65B 11/045
See application file for complete search history.

(56) References Cited

U.S. PATENT DOCUMENTS

| | | | | |
|---|---|---|---|---|
| 2020/0063355 | A1* | 2/2020 | Everett | D21H 15/04 |
| 2025/0012015 | A1* | 1/2025 | Berglund | B65B 11/045 |

FOREIGN PATENT DOCUMENTS

| | | | | | |
|---|---|---|---|---|---|
| EP | 0533520 | | | 3/1993 | |
| EP | 2955269 | | | 12/2015 | |
| EP | 3211135 | | | 8/2017 | |
| EP | 3385442 | | | 10/2018 | |
| EP | 3385444 | | | 10/2018 | |
| EP | 3380320 | B1 | * | 1/2021 | B32B 7/02 |
| FR | 2675466 | | | 10/1992 | |
| GB | 2613511 | A | * | 6/2023 | D21H 21/18 |
| JP | H05310211 | | | 11/1993 | |
| SE | 545458 | C2 | * | 9/2023 | B32B 37/12 |
| SE | 545997 | C2 | * | 4/2024 | D21H 21/18 |
| WO | 2017/163176 | | | 9/2017 | |
| WO | WO-2019148287 | A1 | * | 8/2019 | D21F 11/00 |
| WO | WO-2022140813 | A1 | * | 7/2022 | B65D 77/003 |

* cited by examiner

PALLET OUTER PACKAGING PAPER

BACKGROUND OF THE INVENTION

The invention relates to a pallet outer packaging paper, in particular for the outer packaging of homogeneous pallets, to an outer packaging method for pallets using such a pallet outer packaging paper, and to a method for producing such a pallet outer packaging paper.

In the attempt to considerably reduce the amount of plastic or plastic materials in principle, suitable substitute materials for plastic are sought in many sectors. For example, substitute solutions are sought for the plastic films that are ubiquitous in the packaging industry. However, owing to the inherent properties of plastic films, such as good deformability and extensibility and at the same time good strength, the substitution of plastic films by materials with comparable properties has not yet been entirely successful in many sectors.

Paper has been proposed as an alternative to plastic films for many sectors. Paper has also already been mentioned in the past as an alternative, in addition to other alternative materials, in the present case of pallet outer packagings. For example, EP 0 533 520 B1, JP H05310211 A, FR 2675466 A1 or DE 40 18111 A1 are concerned with the outer packaging of pallets, said documents mentioning paper as an outer packaging material in principle. However, hardly any more detailed information regarding paper qualities with suitable properties can be found in the cited documents or in the further prior art relating to pallet outer packagings. Paper is usually mentioned only as a possible outer packaging material and not described in more detail. Obviously, however, not every paper is also suitable as an outer packaging material for securing pallets.

A requirement for possible use as a pallet outer packaging material is good deformability including extensibility, since the outer packaging material must generally be wound completely around a pallet under pretension. In principle, specific papers with good extensibility are already known from the prior art. In particular, so-called sack papers, from which sacks or bags for containing and transporting foodstuffs, cement or other objects are formed, for example, have comparatively high extensibility. Typical representatives of such sack papers and the production thereof are described for example in EP 3 385 442 A1 or EP 3 211 135 B1.

For instance, the paper described in EP 3 385 442 A1 has an extensibility in accordance with ISO 1924-3 in the machine direction of at least 9% and bending resistance values in the MD in the region of 147 mN for a paper with a grammage of 150 g/m$^2$.

EP 2 955 269 A1 discloses a card which consists of a paper laminate and has a paper layer interposed between two highly extensible papers. The highly extensible papers in this case have low stiffness and low dimensional stability in addition to a high extensibility, which is why they need a reinforcing intermediate layer.

U.S. Pat. No. 5,351,461 discloses a device for packaging pallets, with which a micro-crêped, extensibly paper tape is wound around goods situated on a pallet. Such a micro crêped paper has an extensibility of 50 to 100%.

As has been found, such sack papers are suitable for use as pallet outer packaging material only to a very limited extent. For example, it can be found that typical sack papers tend to become damaged, in particular to tear, to an excessive extent during outer packaging of a pallet, which too often leads to a total loss of an outer packaging and is thus uneconomical. In this case, tear formation occurs primarily at the corners and edges of a pallet. Furthermore, with typical sack papers, damage can occur too often at corners and edges of a pallet packaged therewith during transport of the pallet.

Moreover, a series of demands are placed on pallet outer packaging materials and on correspondingly packaged pallets, which demands cannot be met, at least not entirely, by conventional sack papers. For instance, according to industry standard for loading safety EUMOS 40509, a maximum, permanent deformation of 5% and a maximum, elastic deformation of 10% and a displacement between individual pallet layers relative to one another of 2% must not be exceeded. As has been found, typical sack papers cannot fully meet these requirements.

Therefore, there is still a need for improvement in the field of pallet outer packaging materials in the attempt to replace plastic films as outer packaging material.

SUMMARY OF THE INVENTION

The object of the present invention was to overcome the still existing shortcomings of the prior art and to provide a pallet outer packaging paper by means of which an outer packaging of pallets, in particular so-called homogeneous pallets, can be effected in an economically efficient manner, wherein in particular there is an only low frequency of damage during outer packaging and/or transport of a pallet, and which pallet outer packaging paper is thus suitable in principle as a substitute for plastic films. It was also an object of the invention to provide an outer packaging method for pallets using such a pallet outer packaging paper and a method for producing such a pallet outer packaging paper.

This object is achieved by a pallet outer packaging paper, an outer packaging method for pallets, and a method for producing a pallet outer packaging paper according to the claims.

The pallet outer packaging paper is provided in particular for the outer packaging of homogeneous pallets.

The pallet outer packaging paper has an extensibility in accordance with ISO 1924-3:2005 of 8% to 15% in the machine direction and of 8% to 15% in the transverse direction.

The pallet outer packaging paper comprises at least 70 wt %, preferably at least 80 wt % cellulose fibres having a length-weighted mean fibre length in accordance with ISO 16065-2:2014 of 1.8 mm to 2.8 mm.

Furthermore, the pallet outer packaging paper has a bending resistance in accordance with ISO 2493-1:2010, using a bending angle of 15° and a test bending length of 10 mm, of at most 35 mN in the machine direction and at most 30 mN in the transverse direction, and a bending resistance index of at most 100 Nm$^6$/kg$^3$ in the machine direction and at most 80 Nm$^6$/kg$^3$ in the transverse direction. A grammage of the pallet outer packaging paper is 50 g/m$^2$ to 90 g/m$^2$.

Furthermore, the pallet outer packaging paper has a lignin content in accordance with JAYME/KNOLLE/RAPP of 4 wt % to 12 wt %.

The procedure for gravimetrically determining a lignin content in accordance with JAYME/KNOLLE/RAPP can be found in JAYME G., KNOLLE H. and G. RAPP, "Entwicklung und endgültige Fassung der Lignin-Bestimmungsmethods nach JAYME-KNOLLE", Das Papier 12, 464-467 (1958), No. 17/18. The procedure described herein comprises an extraction by means of an extraction mixture consisting of methanol and benzene, in which dichloromethane can be used instead of this at the extraction agent, as in known per se and customary nowadays.

It appears that the balance between formability and strength, which is important for the use of the pallet outer packaging paper, can be influenced favourably by a lignin content within the specified range. This contrasts with typical sack papers, in which bleached sulphate pulp with only a very low lignin content is often used for production. Furthermore, this feature has an ecologically but also economically favourable effect in terms of the production of the pulp, since a more efficient provision of the pulp is made possible with a higher wood yield. In addition, lignin contained in the pallet outer packaging paper exhibits an effect as protection from UV light, which is advantageous for example if a pallet packaged using the outer packaging paper is stored outside.

The term pallet can mean a load of load objects or packaged goods which are stacked on a pallet carrier. In this respect, the term pallet load or packaged load can also be used for the term pallet. The term pallet should by no means be understood to mean only a pallet carrier, for example a wooden frame, the outer packaging of which would therefore be pointless. However, the pallet outer packaging paper can also be used, for example, for the outer packaging of so-called silage bales, which silage bales are packaged in a similar manner to pallets.

The term homogeneous pallet can be understood, as known per se, to mean a pallet with uniformly stacked load units or packaged goods so that a cuboid, cube-shaped, cylindrical or polygonal pallet or pallet load results from this stacking. A homogeneous pallet therefore has corners and continuous edge extents in accordance with the geometric body structure of a cuboid, cube, cylinder or other body with a polygon as the base, without there being substantial defects in these possible geometric structures, such as holes resulting from missing packaged goods. This contrasts with so-called heterogeneous pallets, which have an irregular structure or shape. This irregular structure of a heterogeneous pallet is often attributable to differently shaped individual packaged goods, whereas the individual packaged goods to be stacked in a homogeneous pallet usually have the same geometric shape.

As known per se, the terms machine direction and transverse direction correspond to the definitions in SCAN-P 9:93, for example.

Thanks to the features of the pallet outer packaging paper, pallets, in particular homogeneous pallets, can be packaged efficiently by hand or else by machine. In particular, thanks to the features of the pallet outer packaging paper, damage to the paper during an outer packaging process itself or else during subsequent transport of a packaged pallet can be effectively hindered. This contrasts with typical sack papers, in which it has been found that damage, in particular tearing in the region of corners and edges of a pallet, often occurs. The low bending resistance of the pallet outer packaging paper is essential here, as a result of which the formation of predetermined tearing lines in the outer packaging paper in the region of corners and edges of a pallet can be hindered. Consequently, outer packagings with a substitute material for plastic films having improved efficiency also from an economic standpoint can be provided. In addition to other influencing factors, the mechanical properties of the outer packaging paper can be influenced essentially by the choice of the length-weighted mean fibre length of the cellulose fibres.

Furthermore, improved temperature protection can be provided by an outer packaging paper formed in this way in comparison with conventional outer packaging plastic films, since an outer packaging paper has comparatively better insulation properties. Moreover, an outer packaging material with very good puncture resistance can be provided by the outer packaging paper having the specified parameters.

In a development of the pallet outer packaging paper, a ratio of the extensibility in accordance with ISO 1924-3:2005 in the machine direction to the extensibility in accordance with ISO 1924-3:2005 in the transverse direction of the pallet outer packaging paper can be 1.0 to 1.4. The extensibility in the machine direction can therefore be at least equal to or up to 1.4 times greater than in the transverse direction.

Thanks to this feature, the outer packaging paper can be given an improved resistant strength to tear formation; in particular damage to the pallet outer packaging paper during an outer packaging process under pretension can be hindered.

In the pallet outer packaging paper, it can also be provided for a ratio of the bending resistance in accordance with ISO 2493-1:2010 in the machine direction to the bending resistance in accordance with ISO 2493-1:2010 in the transverse direction to be 1.0 to 1.3. The bending resistance in the machine direction can therefore be at least equal to or up to 1.3 times greater than in the transverse direction.

Thanks to this feature, damage, in particular tear formation in a preferred direction in the outer packaging paper, can be hindered both during an outer packaging process and, for example, during transport of a packaged pallet. Specifically, an outer packaging paper with good flexibility can be provided, by means of which a pallet or the packaged goods of a pallet can be wrapped tightly, and as a result good stabilisation of a pallet can be achieved.

Furthermore, the pallet outer packaging paper can have a tensile energy absorption index (TEA index) in accordance with ISO 1924-3:2005 of 5.0 J/g to 6.5 J/g in the machine direction and of 2.7 J/g to 3.7 J/g in the transverse direction.

Tensile energy absorption indices from the specified value ranges have proven particularly suitable for the pallet outer packaging paper, since sufficiently good deformability but also sufficiently good tensile strength can be achieved both in the machine direction and in the transverse direction.

Consequently, it can also be provided for the pallet outer packaging paper to have a tensile index in accordance with ISO 1924-3:2005 of at least 100 Nm/g in the machine direction.

As a result, the pallet outer packaging paper can be wound around a pallet or pallet load under sufficient pretension, in particular also by machine, during an outer packaging process.

In a development, the pallet outer packaging paper can have a wet tensile index in accordance with ISO 3781:2011 of at least 10 Nm/g.

Furthermore, the pallet outer packaging paper can have a Cobb 1800 value in accordance with ISO 535:2014 of at most 60 $g/m^2$.

Thanks to these features, a pallet packaged with the pallet outer packaging paper can also be temporarily stored, for example, in a moist environment, since an improved resistance to moisture can be provided.

Furthermore, the pallet outer packaging paper can have a tear index in accordance with ISO 1974:2012 of at least 10 $mN \cdot m^2/g$ in the machine direction and of at least 15 $mN \cdot m^2/g$ in the transverse direction.

Thanks to this feature, a yet further improvement in the damage resistance of the outer packaging paper can be provided. Specifically, the tear index of the outer packaging paper can be influenced by the type of pulp, in particular the fibre length of the cellulose fibres of the pulp.

Moreover, the pallet outer packaging paper can have a burst index in accordance with ISO 2758:2014 of at least 7.0 kPa·m²/g.

As has been found, the outer packaging paper can be effectively hindered from breaking open by a minimum burst index as specified. The burst index of the outer packaging paper can also be influenced by the type of pulp and the fibre length of the cellulose fibres of the pulp, but also by additives added to the outer packaging paper.

Furthermore, the pallet outer packaging paper can have a content of sizing agent of 0.015 wt % to 0.04 wt %.

Moreover, it can be provided for the outer packaging paper to contain 0.7 wt % to 1.2 wt % starch, preferably cationic starch.

Furthermore, the outer packaging paper can comprise 0.05 wt % to 0.2 wt % of a dry strength agent, preferably a dry strength agent containing glyoxalated polyacrylamide.

The mechanical properties of the pallet outer packaging paper, in particular also the bending resistance, can also be influenced by such additives, as a result of which a more efficient wrapping of a pallet, with a lower tendency of the outer packaging paper to form tears, can be achieved.

Finally, at least one surface of the pallet outer packaging paper can have micro-crêping.

This leads, inter alia, to an improved deformability of the outer packaging paper without the strength values thereof being negatively influenced to too great an extent. Such a micro-crêping can be produced, for example, by means of a so-called Clupak device integrated in a paper machine, as is described for example in the documents EP 3 385 442 A1 or EP 3 211 135 B1 already cited in the introduction. Alternatively, to achieve high extensibility in paper, a so-called Expanda® unit can also be used, as is described for example in a review by Vishtal & Retulainen, 2014 "Extensibility review", BioResources 9(4), 7951-8001.

The object of the invention is also achieved by an outer packaging method for pallets.

The outer packaging method comprises the steps of

- providing a pallet, in particular a homogeneous pallet, consisting of a pallet carrier with packaged goods stacked thereon,
- positioning the pallet in an outer packaging device and wrapping the pallet with one or more layers of an outer packaging material.

It is essential in the outer packaging method that a pallet outer packaging paper as described above and below is used as the outer packaging material.

The exact performance and also the equipment used to perform the outer packaging method can be multifarious in nature; a person skilled in the art is familiar with numerous outer packaging methods and types of equipment for performing outer packagings from the prior art. In this connection, reference is made purely by way of example to the documents EP 0 533 520 B1, JP H05310211 A, FR 2675466 A1 or DE 40 18111 A1 already cited in the introduction.

Of course, the outer packaging method, in particular the step of wrapping a pallet, can also in principle be performed manually.

The object of the invention is also achieved by a method for producing a pallet outer packaging paper, in particular for the outer packaging of homogeneous pallets. The method can in particular be provided to produce a pallet outer packaging paper as described above.

The method comprises the steps of a) providing a pulp containing, in relation to 100 wt % pulp dry matter, at least 70 wt %, preferably at least 80 wt % cellulose fibres with a length-weighted mean fibre length in accordance with ISO 16065-2:2014 of 1.8 mm to 2.8 mm,
b) producing an aqueous suspension comprising the pulp with a water content of 97 wt % to 99.85 wt %,
c) applying the aqueous suspension by means of a head box to a wire of a forming section to form a paper web, the wire being moved at a speed 1.5% to 6%, preferably 2% to 5%, higher or lower than an application rate of the aqueous suspension to the wire,
d) further processing the paper web from step c) to form the outer packaging paper with multi-stage drying of the paper web.

In the process, the pallet outer packaging paper is given an extensibility in accordance with ISO 1924-3:2005 of 8% to 15% in the machine direction and of 8% to 15% in the transverse direction, a bending resistance in accordance with ISO 2493-1:2010, using a bending angle of 15° and a test bending length of 10 mm, of at most 35 mN in the machine direction and at most 30 mN in the transverse direction, and a bending resistance index of at most 100 $Nm^6/kg^3$ in the machine direction and at most 80 $Nm^6/kg^3$ in the transverse direction, and a grammage of 50 $g/m^2$ to 90 $g/m^2$.

Thanks to the specified measures, a pallet outer packaging paper having mechanical properties sufficient for the outer packaging of pallets, in particular of homogeneous pallets can be produced. The advantages achievable by such a pallet outer packaging paper have already been described above. In particular, a pallet outer packaging paper with sufficiently low bending resistance but sufficient strength can be produced, which has proven resistant to damage during wrapping of a pallet, even under pretension of the outer packaging paper.

Preferably, coniferous woods can be used at least predominantly to produce the pulp. Mixtures of multiple coniferous woods and mixtures of coniferous woods with deciduous woods are also possible in principle. For example, a mixture of 40 wt % to 50 wt % spruce wood and 50 wt % to 60 wt % pine wood to produce the pulp has proven favourable for obtaining the desired length-weighted mean cellulose fibre lengths specified above.

In a preferred development of the method, in step a), the pulp can be provided, in relation to 100 wt % pulp dry matter, with a content of 4 wt % to 12 wt % lignin in accordance with JAYME/KNOLLE/RAPP.

The balance between formability and strength, which is important for the use of the pallet outer packaging paper, can be influenced favourably by this measure. Furthermore, this feature has an ecologically but also economically favourable effect in terms of the production of the pulp, since a more efficient provision of the pulp is made possible with a higher wood yield.

In the method, an additional step a1) can be provided, in which an aqueous suspension of the pulp from step a) is produced with a consistency of 25% to 40% and subjected to mechanical processing and refinement in a high-consistency refiner to a Schopper-Riegler value in accordance with ISO 5267-1:1999 of 10 °SR to 18 °SR.

Such mechanical processing in the high-consistency range can be performed, for example, at a specific refining power of approximately 270 kWh/to, that is, approximately 270 kWh per tonne of pulp dry matter. Such refinement can hinder clumping of cellulose fibres, as a result of which a more homogeneous arrangement of the cellulose fibres in the pulp can be achieved for the subsequent steps and ultimately also in the pallet outer packaging paper. This method measure generally results in improved deformability and flexibility of the outer packaging paper and has a favourable effect on an outer packaging process.

Additionally or alternatively, a method step a2) can however also be provided, in which an aqueous suspension of the pulp from step a) or a1) is produced with a consistency of 3% to 5% and subjected to mechanical processing and refinement in one or more low-consistency refiner(s) to a Schopper-Riegler value in accordance with ISO 5267-1: 1999 of 15 °SR to 30 °SR.

The outer packaging paper can also be given an improved deformability and at the same time mechanical strength thereby. Such mechanical processing in the low-consistency range can be performed for example in one or more refiner (s) at a specific total refining power of approximately 60 kWh/to.

However, a further method step b1 can also be provided, in which 0.015 to 0.04 wt % sizing agent, in relation to 100 wt % pulp dry matter, is added as an additive to the aqueous suspension.

Furthermore, it can be provided in the method for 0.7 wt % to 1.2 wt % starch, preferably cationic starch, in relation to 100 wt % pulp dry matter, to be added as an additive to the aqueous suspension.

Furthermore, 0.05 wt % to 0.2 wt % of a dry strength agent, in relation to 100 wt % pulp dry matter, can be added as an additive to the aqueous suspension. Preferably, a dry strength agent containing glyoxalated polyacrylamide can be added to the aqueous pulp suspension.

The mechanical properties of the pallet outer packaging paper, in particular also the bending resistance, can also be influenced by these method measures relating to an addition of additives. The above statements relating to amounts of additive in wt % are not to be understood as a component of the 100 wt % pulp dry matter but rather a respective statement in wt % additive is specified in relation to 100 wt % pulp dry matter.

Usually, multi-stage drying of the paper web takes place in step d) of the method, wherein, as known per se, pre-drying by means of a forming section can take place first, followed by drying by means of a press section, and finally drying by means of a drying section.

In particular, during the drying in method step d), micro-crêping can be introduced into at least one surface of the paper web.

By introducing micro-crêping, the formability of the pallet outer packaging paper can again be increased further. In particular, the extensibility of the outer packaging paper can be increased by this measure. Such micro-crêping can be introduced into the paper web, for example, during drying, by means of a so-called Clupak device integrated in a paper machine, as is described for example in the documents EP 3 385 442 A1 or EP 3 211 135 B1 already cited in the introduction. Alternatively, to provide high extensibility in paper, a so-called Expanda® unit can also be used, as is described for example in a review by Vishtal & Retulainen, 2014 "Extensibility review", BioResources 9(4), 7951-8001.

In particular, the pallet outer packaging paper can be given an extensibility in accordance with ISO 1924-3:2005 of 8% to 15% in the machine direction and of 8% to 15% in the transverse direction with the specified method. Furthermore, by means of the method, the pallet outer packaging paper can be given preferably a ratio of the extensibility in accordance with ISO 1924-3:2005 in the machine direction to the extensibility in accordance with ISO 1924-3:2005 in the transverse direction of 1.0 to 1.4 and, independently thereof, preferably a ratio of the bending resistance in accordance with ISO 2493-1:2010 in the machine direction to the bending resistance in accordance with ISO 2493-1: 2010 in the transverse direction of 1.0 to 1.3. The pallet outer packaging paper can therefore be given an extensibility in the machine direction which is at least equal to or up to 1.4 times greater than the extensibility in the transverse direction. Independently of this, the pallet outer packaging paper can therefore be given a bending resistance in the machine direction which is at least equal to or up to 1.3 times greater than the bending resistance in the transverse direction.

Moreover, it can be provided in the method for the pallet outer packaging paper to be given a tensile energy absorption index (TEA index) in accordance with ISO 1924-3:2005 of 5.0 J/g to 6.5 J/g in the machine direction and of 2.7 J/g to 3.7 J/g in the transverse direction. The pallet outer packaging paper can also be given a tensile index in accordance with ISO 1924-3:2005 of at least 100 Nm/g in the machine direction. It can also be advantageous in the method if a wet tensile index in accordance with ISO 3781:2011 of at least 10 Nm/g and a Cobb 1800 value in accordance with ISO 535:2014 of at most 60 g/m$^2$ is set in the pallet outer packaging paper.

DESCRIPTION OF THE DRAWINGS

For better understanding of the invention, it is explained in more detail using the exemplary embodiments shown in the drawings below.

The figures show the following in highly simplified, schematic representations.

DETAILED DESCRIPTION OF THE INVENTION

Figure 1:
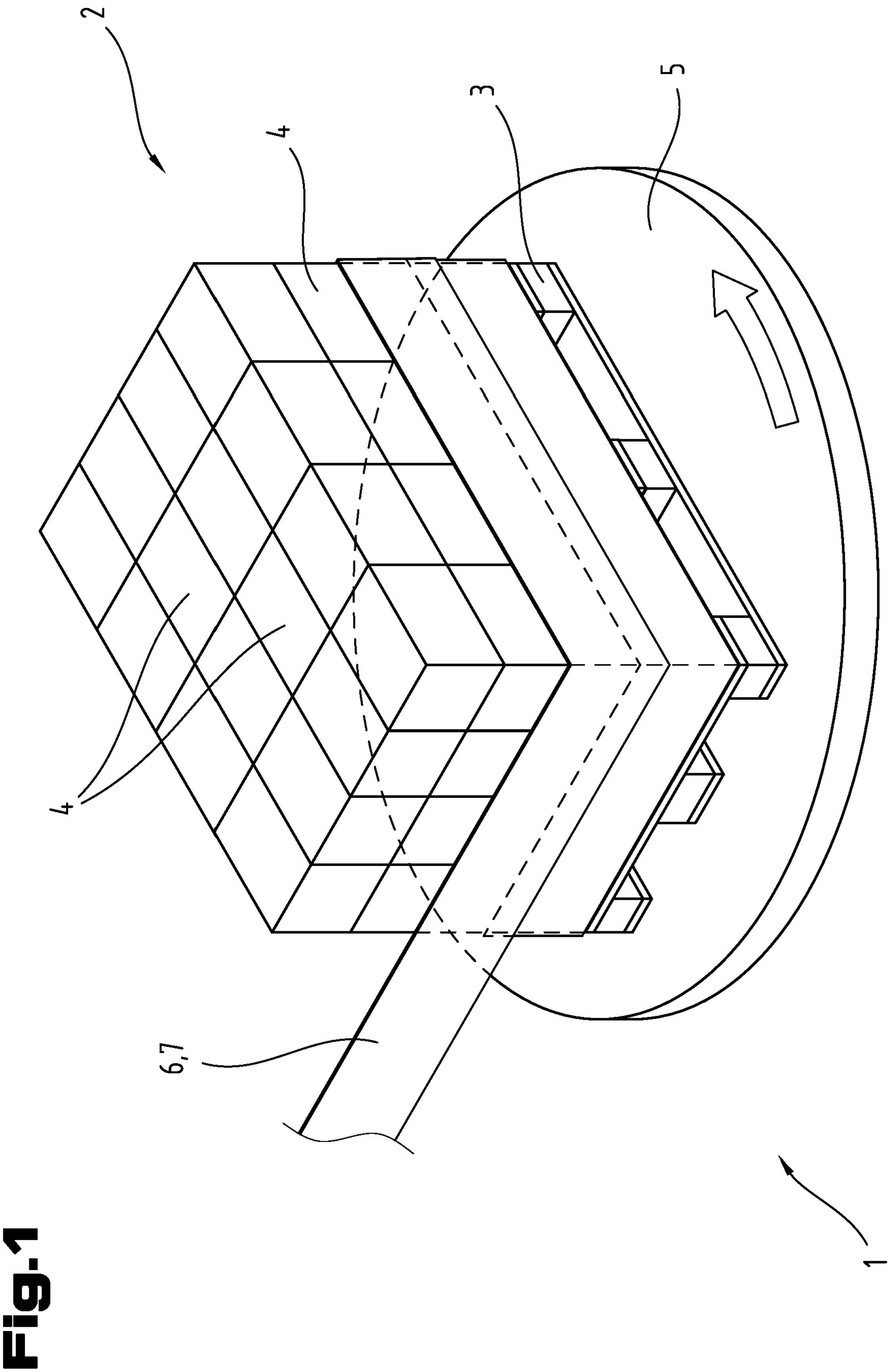
FIG. 1 details of an exemplary embodiment of an outer packaging method using an exemplary pallet outer packaging device.

It should be stated first that in the different embodiments described, identical parts are provided with identical reference signs and identical component names, and the disclosures in the description as a whole can be transferred, mutatis mutandis, to identical parts with identical reference signs and identical component names. The position information selected in the description, e.g. top, bottom, lateral etc. relates to the drawing directly described and presented, and when the position changes this position information should be transferred, mutatis mutandis, to the new position.

FIG. 1 shows details of an exemplary embodiment of an outer packaging method using a typical pallet outer packaging device 1 or station. As shown, in a typical outer packaging method, a pallet 2 comprising a pallet carrier 3 with packaged goods 4 stacked thereon is provided and positioned in an outer packaging device 1. In the exemplary embodiment shown, the pallet can be positioned on a rotatable, driven turntable 5. The pallet 2 shown in FIG. 1 is designed as a so-called homogeneous pallet and in the exemplary embodiment shown has a cuboid shape. Such a pallet 2 can be wrapped with an outer packaging material 6 by rotating the turntable 5. The outer packaging material 6 can for example be drawn from a roll (not shown) and arranged height-adjustably on the pallet 2 using guiding mechanisms and a pretensioning device (likewise not shown) and wound around the pallet 2 by rotating the turntable 5 as indicated in FIG. 1. In the process, the pallet 2 can be wrapped with one or more layers of an outer packaging material 6.

In the present invention, the outer packaging material 6 is formed by a pallet outer packaging paper 7 as described above and also below.

The pallet outer packaging paper 7 is provided in particular for the outer packaging of homogeneous pallets 2, as illustrated in FIG. 1. An extensibility in accordance with ISO 1924-3:2005 of the outer packaging paper 7 is 8% to 15% in the machine direction and 8% to 15% in the transverse direction.

The outer packaging paper 7 has at least 70 wt %, preferably at least 80 wt %, cellulose fibres having a length-weighted mean fibre length in accordance with ISO 16065-2:2014 of 1.8 mm to 2.8 mm.

To achieve the best possible damage resistance, the pallet outer packaging paper 7 has a bending resistance in accordance with ISO 2493-1:2010, using a bending angle of 15° and a test bending length of 10 mm, of at most 35 mN in the machine direction and at most 30 mN in the transverse direction, and a bending resistance index of at most 100 $Nm^6/kg^3$ in the machine direction and at most 80 $Nm^6/kg^3$ in the transverse direction. A grammage of the outer packaging paper 7 is 50 $g/m^2$ to 90 $g/m^2$.

A ratio of the extensibility in accordance with ISO 1924-3:2005 in the machine direction to the extensibility in accordance with ISO 1924-3:2005 in the transverse direction of the outer packaging paper 7 can be 1.0 to 1.4. Furthermore, a ratio of the bending resistance in accordance with ISO 2493-1:2010, using a bending angle of 15° and a test bending length of 10 mm, in the machine direction to the bending resistance in accordance with ISO 2493-1:2010, using a bending angle of 15° and a test bending length of 10 mm, in the transverse direction of the outer packaging paper 7 can be 1.0 to 1.3. Moreover, the outer packaging paper 7 can have a tensile energy absorption index (TEA index) in accordance with ISO 1924-3:2005 of 5.0 J/g to 6.5 J/g in the machine direction and of 2.7 J/g to 3.7 J/g in the transverse direction.

Specifically, the outer packaging paper 7 can have a tensile index in accordance with ISO 1924-3:2005 of at least 100 Nm/g in the machine direction. A high tensile index in the machine direction is desirable primarily because the outer packaging paper 7 is usually drawn from a roll in this direction and pretensioned in the machine direction during outer packaging of a pallet 2.

Furthermore, the pallet outer packaging paper 7 can have a wet tensile index in accordance with ISO 3781:2011 of at least 10 Nm/g. In this connection, the outer packaging paper 7 can also have a Cobb 1800 value in accordance with ISO 535:2014 of at most 60 $g/m^2$.

Furthermore, the pallet outer packaging paper can have a tear index in accordance with ISO 1974:2012 of at least 10 $mN \cdot m^2/g$ in the machine direction and of at least 15 $mN \cdot m^2/g$ in the transverse direction, and a burst index in accordance with ISO 2758:2014 of at least 7.0 $kPa \cdot m^2/g$.

In addition to the cellulose fibres, the outer packaging paper can have a lignin content in accordance with JAYME/KNOLLE/RAPP of 4 wt % to 12 wt %.

Moreover, the outer packaging paper 7 can have a content of sizing agent, for example, alkenyl succinic anhydride (ASA), of 0.015 wt % to 0.04 wt %.

As a further additive, the outer packaging paper can contain 0.7 wt % to 1.2 wt % starch, preferably cationic starch. Furthermore, the outer packaging paper can comprise 0.05 wt % to 0.2 wt % of a dry strength agent, preferably a dry strength agent containing glyoxalated polyacrylamide. In principle, the pallet outer packaging paper can also contain further additives customary in paper technology in small proportions; alum can be mentioned purely by way of example, which can be present in the outer packaging paper for example in a proportion of 0.02 wt % to 0.08 wt %.

Finally, at least one surface of the outer packaging paper 7 can have micro-crêping.

A method for producing a pallet outer packaging paper 7, in particular for the outer packaging of homogeneous pallets, can in principle be carried out in or by means of a paper machine. The basic structure and basic processes in such a paper machine are known to the person of average skill in the art of paper production. Therefore, only a short summary of the method for producing the pallet outer packaging paper is described below, with some method steps being explained in more detail. The method can in particular be provided to produce a pallet outer packaging paper as described above.

The method comprises, as known per se, providing a pulp as step a). In the present method, the pulp provided in step a) has, in relation to 100 wt % pulp dry matter, at least 70 wt %, preferably at least 80 wt %, cellulose fibres having a length-weighted mean fibre length in accordance with ISO 16065-2:2014 of 1.8 mm to 2.8 mm. Preferably, the pulp is a sulphate pulp, also referred to as Kraft pulp, the pulp preferably being produced from coniferous wood, such as spruce wood and/or pine wood, by means of the so-called Kraft method.

In terms of the desired mechanical properties of the outer packaging paper, it can be advantageous if, in an embodiment of the method for the production thereof, the pulp is provided with a content of 4 wt % to 12 wt % of lignin in accordance with JAYME/KNOLLE/RAPP, in relation to 100 wt % pulp dry matter, in step a).

A further method step a1) can also be expedient, in which an aqueous suspension of the pulp from step a) is produced with a consistency of 25% to 40% and subjected to mechanical processing and refinement in a high-consistency refiner to a Schopper-Riegler value of 10 °SR to 18 °SR. An energy input for such mechanical high-consistency processing or refinement can be, for example, 230 kWh/tonne pulp dry matter to 310 kWh/tonne pulp dry matter, in particular approximately 270 kWh/tonne pulp dry matter.

Additionally or independently of such a method step a1), a method step a2) can however also be useful, in which an aqueous suspension of the pulp from step a) or a1) is produced with a consistency of 3% to 5% and subjected to mechanical processing and refinement in one or more low-consistency refiner(s) to a Schopper-Riegler value of 15 °SR to 30 °SR. For such mechanical processing of the pulp at low consistency, a total energy input can be, for example, 30 kWh/tonne pulp dry matter to 90 kWh/tonne pulp dry matter, in particular approximately 60 kWh/tonne pulp dry matter.

To introduce the pulp into a paper machine, the production of an aqueous suspension comprising the pulp with a water content of 97 wt % to 99.85 wt % is provided in a further method step b). This may follow mechanical processing according to steps a1) and/or a2) specified above. A pH of this aqueous suspension can be 5-7, for example.

It can be provided here for customary additives to be added to the pulp suspension.

In particular, it can be provided for 0.015 wt % to 0.04 wt % sizing agent, in relation to 100 wt % pulp dry matter, to be added to the aqueous suspension 8 in a step b1).

Furthermore, it can be provided in the method for 0.7 wt % to 1.2 wt % starch, preferably cationic starch, in relation to 100 wt % pulp dry matter, to be added to the aqueous suspension.

Furthermore, 0.05 wt % to 0.2 wt % of a dry strength agent, in relation to 100 wt % pulp dry matter, can be added to the aqueous suspension. Preferably, a dry strength agent containing glyoxalated polyacrylamide can be added to the aqueous pulp suspension.

Moreover, further additives customary in paper technology can also be added in small proportions to the aqueous pulp suspension.

The statement of the respective range limits in wt % for all the additives mentioned above which can be added to the aqueous pulp suspension if necessary should be understood to mean that the respective wt % additive is not a component of the 100 wt % pulp dry matter but that the wt % additive is stated in each case in relation to 100 wt % pulp dry matter.

Figure 2:
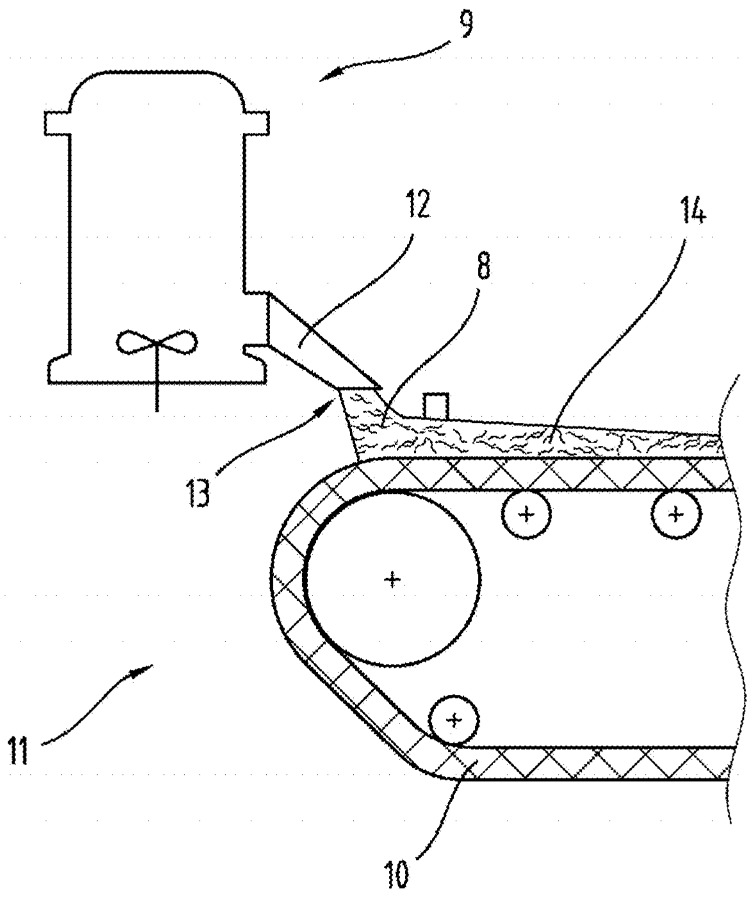
FIG. 2 details of an exemplary embodiment of a head box and a forming section of a paper machine.

In a subsequent step c), the suspension produced in step b) is introduced into a paper machine. As illustrated in FIG. 2, the suspension 8 of the pulp can be applied from a reservoir 9 or temporary storage container for the pulp suspension 8 to a rotating wire 10 of a forming section 11. This takes place as usual via a nozzle-like feed 12 with an outlet opening 13. Uniform application of the aqueous pulp suspension 8 to the wire 10 forms a paper web 14 on the wire 10.

As known per se, the mere process of application to the wire 10 causes an at least partial alignment of the highly anisotropic cellulose fibres in the aqueous pulp suspension. This orientation of the fibres both in terms of alignment and extent of the alignment can be influenced by the choice of application parameters, such as the consistency of the applied pulp suspension 8, but also for example by the advancing speed of the wire 10 relative to the application speed of the pulp suspension. The type and extent of the orientation of the cellulose fibres consequently also influence the properties of the resulting paper after further processing including drying of the paper web in the subsequent further sections of the paper machine.

To produce the pallet outer packaging paper having the properties specified above, owing to which said paper is suitable for use as pallet outer packaging paper, it has proven favourable for the wire 10 to be moved at a speed 1.5% to 6%, preferably 2% to 5%, higher or lower than an application rate of the aqueous pulp suspension 8 to the wire 10. A paper machine for producing the pallet outer packaging paper can preferably be provided with a longitudinal wire, in particular a Fourdrinier forming section.

However, it should be mentioned at this point that the properties of the resulting pallet outer packaging paper can also be influenced in terms of the desired mechanical properties by further production parameters. For instance, as already stated, the mechanical properties can be influenced by the type of pulp itself, for example by the choice of the wood type(s) used for the production of the pulp. In the present case, coniferous woods can preferably be used to produce the pulp; in particular a proportion of coniferous woods can be at least 80 wt %.

Furthermore, the mechanical properties of the pallet outer packaging paper can also be influenced by adding various additives to the aqueous pulp suspension. Examples of preferred additives have already been mentioned above in this description.

The mechanical properties of the resulting pallet outer packaging paper can also be influenced by the further course of the method or the further processing of the paper web in the paper machine.

After the application of the pulp suspension 8 in method step c), the paper web 14 is further processed to form the outer packaging paper in a further method step d) with multi-stage drying of the paper web. The successive drying of the paper web 14 can take place as usual by means of the forming section 11, then using a press section and finally by means of a drying section of a paper machine, as is generally known to a person skilled in the art.

Figure 3:
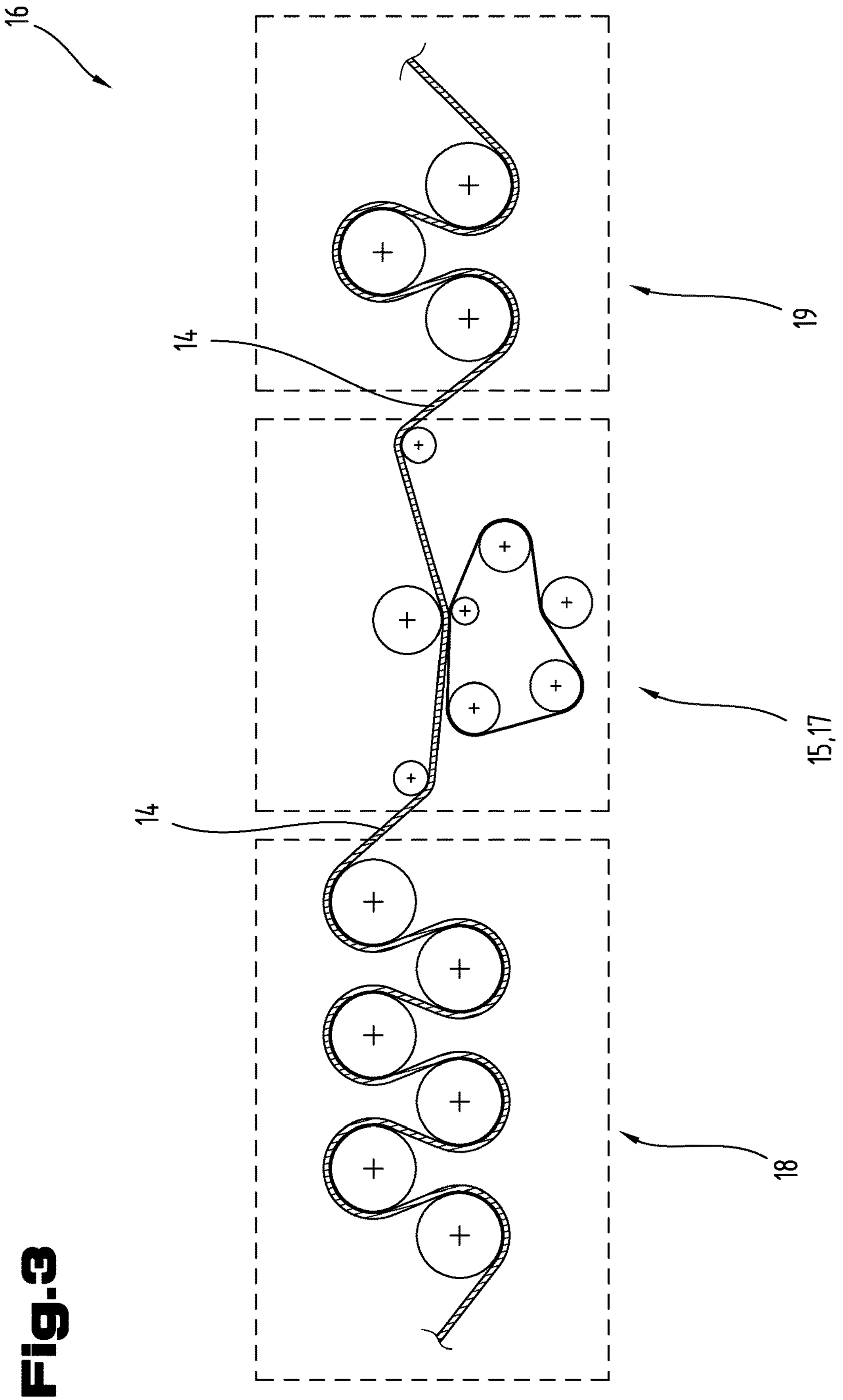
FIG. 3 details of an exemplary embodiment of a drying section with a crêping device of a paper machine.

Specifically, during method step d), micro-crêping can be introduced into at least one surface of the paper web 14. Such micro-crêping can be introduced into the paper web 14 for example by means of a crêping device 15 as said paper web passes through a drying section 16, as illustrated using FIG. 3. FIG. 3 shows details of a part of a drying section 16 of a paper machine. The crêping device 15 can be formed, for example, by a so-called Clupak system or Clupak unit 17. As known per se, when a Clupak unit 17 is used, micro-crêping is introduced by compression of the paper web between a rotating cloth and a cylinder, as also described for example in the document EP 3 211 135 B1 mentioned in the introduction.

Such a crêping device 15 or Clupak unit 17 can be arranged in the course of a drying section 16. In particular, a crêping device 15 or Clupak system 17 can be arranged between a pre-drying section 18 and a post-drying section 19 of a drying section 16, as illustrated in FIG. 3. As known per se, the compression of the paper web 14 can be achieved in a Clupak unit 17 by selecting a lower pull-off speed by means of the post-drying section 19 than an advancing speed from the pre-drying section 18 into the Clupak unit 17.

Alternatively to the Clupak unit 17 shown in FIG. 3, a so-called Expanda® unit can also be used as the crêping device, for example, as is described for example in a review by Vishtal & Retulainen, 2014 "Extensibility review", BioResources 9(4), 7951-8001.

Ultimately, it is essential to the method for producing a pallet outer packaging paper that the pallet outer packaging paper is given an extensibility in accordance with ISO 1924-3:2005 of 8% to 15% in the machine direction and of 8% to 15% in the transverse direction, a bending resistance in accordance with ISO 2493-1:2010, using a bending angle of 15° and a test bending length of 10 mm, of at most 35 mN in the machine direction and at most 30 mN in the transverse direction, a bending resistance index of at most 100 $Nm^6/kg^3$ in the machine direction and at most 80 $Nm^6/kg^3$ in the transverse direction, and a grammage of 50 $g/m^2$ to 90 $g/m^2$. The suitability of the corresponding paper as pallet outer packaging paper has been proven within the specified ranges of these parameters. Outside the specified ranges of the parameters, a greater tendency to failure of the mechanical integrity was found, which reduces the suitability of papers with the corresponding parameters outside the specified ranges.

Furthermore, the pallet outer packaging paper can be given preferably a ratio of the extensibility in accordance with ISO 1924-3:2005 in the machine direction to the extensibility in accordance with ISO 1924-3:2005 in the transverse direction of 1.0 to 1.4 and, independently thereof, preferably a ratio of the bending resistance in accordance with ISO 2493-1:2010 in the machine direction to the bending resistance in accordance with ISO 2493-1:2010 in the transverse direction of 1.0 to 1.3.

Moreover, it can be provided in the method for the pallet outer packaging paper to be given a tensile energy absorption index (TEA index) in accordance with ISO 1924-3:2005 of 5.0 J/g to 6.5 J/g in the machine direction and of 2.7 J/g to 3.7 J/g in the transverse direction. The pallet outer packaging paper can also be given a tensile index in accordance with ISO 1924-3:2005 of at least 100 Nm/g in the machine direction. It can also be advantageous in the method if a wet tensile index in accordance with ISO 3781:2011 of at least 10 Nm/g and a Cobb 1800 value in accordance with ISO 535:2014 of at most 60 g/m$^2$ is set in the pallet outer packaging paper.

The exemplary embodiments show possible variants; it should be noted at this point that the invention is not limited to the variants specifically presented, but rather that various combinations of the individual variants with each other are also possible and that this possibility of variation on the basis of the teaching, involving performing a technical act, of the present invention lies within the capabilities of a person skilled in the art working in this technical field.

The scope of protection is defined by the claims. However, the description and the drawings should be used to interpret the claims. Individual features or combinations of features from the different exemplary embodiments shown and described can be standalone inventive solutions. The object on which the standalone inventive solutions are based can be found in the description.

All statements relating to value ranges in the present description should be understood as including any and all partial ranges; e.g. the statement 1 to 10 should be understood as including all the partial ranges from the lower limit 1 to the upper limit 10, i.e. all the partial ranges begin with a lower limit of 1 or more and end at an upper limit of 10 or less, e.g. 1 to 1.7, or 3.2 to 8.1, or 5.5 to 10.

For the sake of order, it should finally be mentioned that, for better understanding of the structure, some elements have been shown in a manner not to scale and/or enlarged and/or reduced in size.

REFERENCE NUMBERS

1 Pallet outer packaging device
2 Pallet
3 Pallet carrier
4 Packaged goods
5 Turntable
6 Outer packaging material
7 Pallet outer packaging paper
8 Pulp suspension
9 Reservoir
10 Wire
11 Forming section
12 Feed
13 Outlet opening
14 Paper web
15 Crêping device
16 Drying section
17 Clupak unit
18 Pre-drying section
19 Post-drying section

The invention claimed is:

1. A pallet outer packaging paper for the outer packaging of homogeneous pallets, having an extensibility in accordance with ISO 1924-3:2005 of 8% to 15% in a machine direction and of 8% to 15% in a transverse direction, wherein the outer packaged paper comprises at least 70 wt % cellulose fibres having a length-weighted mean fibre length in accordance with ISO 16065-2:2014 of 1.8 mm to 2.8 mm, it has a lignin content in accordance with JAYME/KNOLLE/RAPP of 4 wt % to 12 wt %, and that it has a bending resistance in accordance with ISO 2493-1:2010, using a bending angle of 15° and a test bending length of 10 mm, of at most 35 mN in the machine direction and at most 30 mN in the transverse direction, and a bending resistance index of at most 100 Nm$^6$/kg$^3$ in the machine direction and at most 80 Nm$^6$/kg$^3$ in the transverse direction and a grammage of 50 g/m$^2$ to 90 g/m$^2$.

2. The outer packaging paper according to claim 1, wherein a ratio of the extensibility in accordance with ISO 1924-3:2005 in the machine direction to the extensibility in accordance with ISO 1924-3:2005 in the transverse direction is 1.0 to 1.4.

3. The outer packaging paper according to claim 1, wherein a ratio of the bending resistance in accordance with ISO 2493-1:2010 in the machine direction to the bending resistance in accordance with ISO 2493-1:2010 in the transverse direction is 1.0 to 1.3.

4. The outer packaging paper according to claim 1, wherein it has a tensile energy absorption index (TEA index) in accordance with ISO 1924-3:2005 of 5.0 J/g to 6.5 J/g in the machine direction and of 2.7 J/g to 3.7 J/g in the transverse direction.

5. The outer packaging paper according to claim 1, wherein it has a tensile index in accordance with ISO 1924-3:2005 of at least 100 Nm/g in the machine direction.

6. The outer packaging paper according to claim 1, wherein it has a wet tensile index in accordance with ISO 3781:2011 of at least 10 Nm/g.

7. The outer packaging paper according to claim 1, wherein it has a Cobb 1800 value in accordance with ISO 535:2014 of at most 60 g/m$^2$.

8. The outer packaging paper according to claim 1, wherein it has a tear index in accordance with ISO 1974:2012 of at least 10 mN·m$^2$/g in the machine direction and of at least 15 mN·m$^2$/g in the transverse direction.

9. The outer packaging paper according to claim 1, wherein it has a burst index in accordance with ISO 2758:2014 of at least 7.0 kPa·m$^2$/g.

10. The outer packaging paper according to claim 1, wherein at least one surface has micro-crêping.

11. An outer packaging method for pallets, comprising the steps of providing a homogeneous pallet, consisting of a pallet carrier with packaged goods stacked thereon, positioning the pallet in an outer packaging device and wrapping the pallet with one or more layers of an outer packaging material, wherein a pallet outer packaging paper according to claim 1 is used as the outer packaging paper.

12. A method for producing a pallet outer packaging paper of homogeneous pallets, according to claim 1, comprising the steps of a) providing a pulp containing, in relation to 100 wt % pulp dry matter, at least 70 wt % cellulose fibres having a lignin content in accordance with JAYME/KNOLLE/RAPP of 4 wt % to 12 wt %, with a length-weighted mean fibre length in accordance with ISO 16065-2:2014 of 1.8 mm to 2.8 mm, b) producing an aqueous suspension comprising the pulp with a water content of 97 wt % to 99.85 wt %, c) applying the aqueous suspension by means of a head box to a rotating wire of a forming section to form a paper web, the wire being moved at a speed 1.5% to 6% higher or lower than an application rate of the aqueous suspension to the wire, d) further processing the paper web from step c) to form the outer packaging paper with multi-stage drying of the paper web, wherein the pallet outer packaging paper has an extensibility in accordance with ISO 1924-3:2005 of 8% to 15% in the machine direction and of 8% to 15% in the transverse direction, a bending resistance in accordance with ISO 2493-1:2010, using a bending angle of 15° and a test bending length of 10 mm, of at most 35 mN in the machine direction and at most 30 mN in the transverse direction, a bending resistance index of at most 100 $Nm^6/kg^3$ in the machine direction and at most 80 $Nm^6/kg^3$ in the transverse direction, and a grammage of 50 $g/m^2$ to 90 $g/m^2$.

13. The method according to claim 12, wherein in step a), the pulp is provided, in relation to 100 wt % pulp dry matter, with a content of 4 wt % to 12 wt % lignin in accordance with JAYME/KNOLLE/RAPP.

14. The method according to claim 12, wherein in a step a1), an aqueous suspension of the pulp from step a) is produced with a consistency of 25% to 40% and subjected to mechanical processing and refinement in a high-consistency refiner to a Schopper-Riegler value in accordance with ISO 5267-1:1999 of 10 °SR to 18 °SR.

15. The method according to claim 12, wherein in a step a2), an aqueous suspension of the pulp from step a) or a1) is produced with a consistency of 3% to 5% and subjected to mechanical processing and refinement in one or more low-consistency refiner(s) to a Schopper-Riegler value in accordance with ISO 5267-1:1999 of 15 °SR to 30 °SR.

16. The method according to claim 12, wherein in a step b1), 0.015 wt % to 0.04 wt % sizing agent, in relation to 100 wt % pulp dry matter, is added to the aqueous suspension.

17. The method according to claim 12, wherein in a step b2), 0.7 wt % to 1.2 wt % starch, in relation to 100 wt % pulp dry matter, is added to the aqueous suspension.

18. The method according to claim 12, wherein in a step b3), 0.05 wt % to 0.2 wt % of a dry strength agent, in relation to 100 wt % pulp dry matter, is added to the aqueous suspension.

19. The method according to claim 12, wherein microcrêping is introduced into at least one surface of the paper web during step d).

* * * * *